Figure 1:
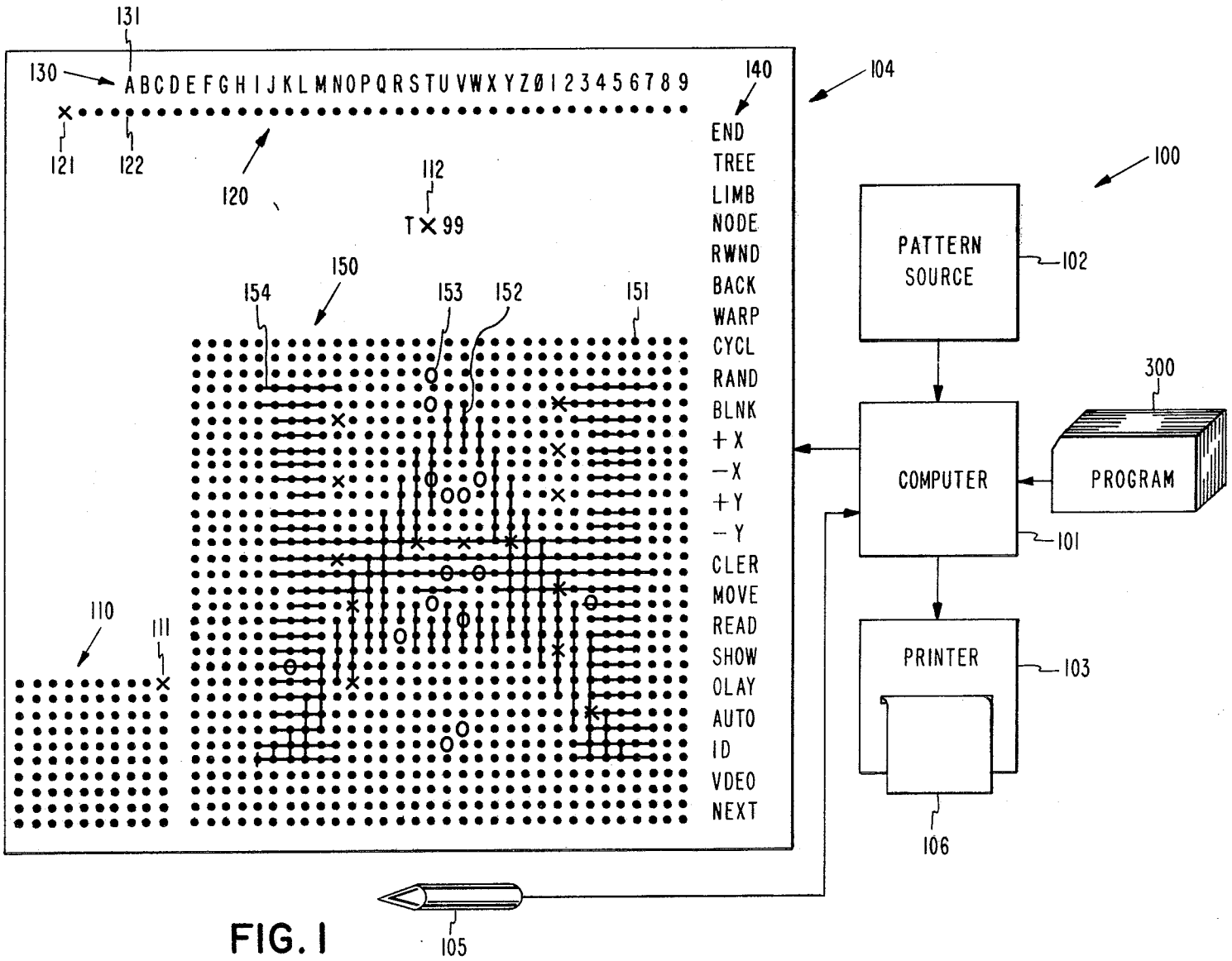
Figure 2:
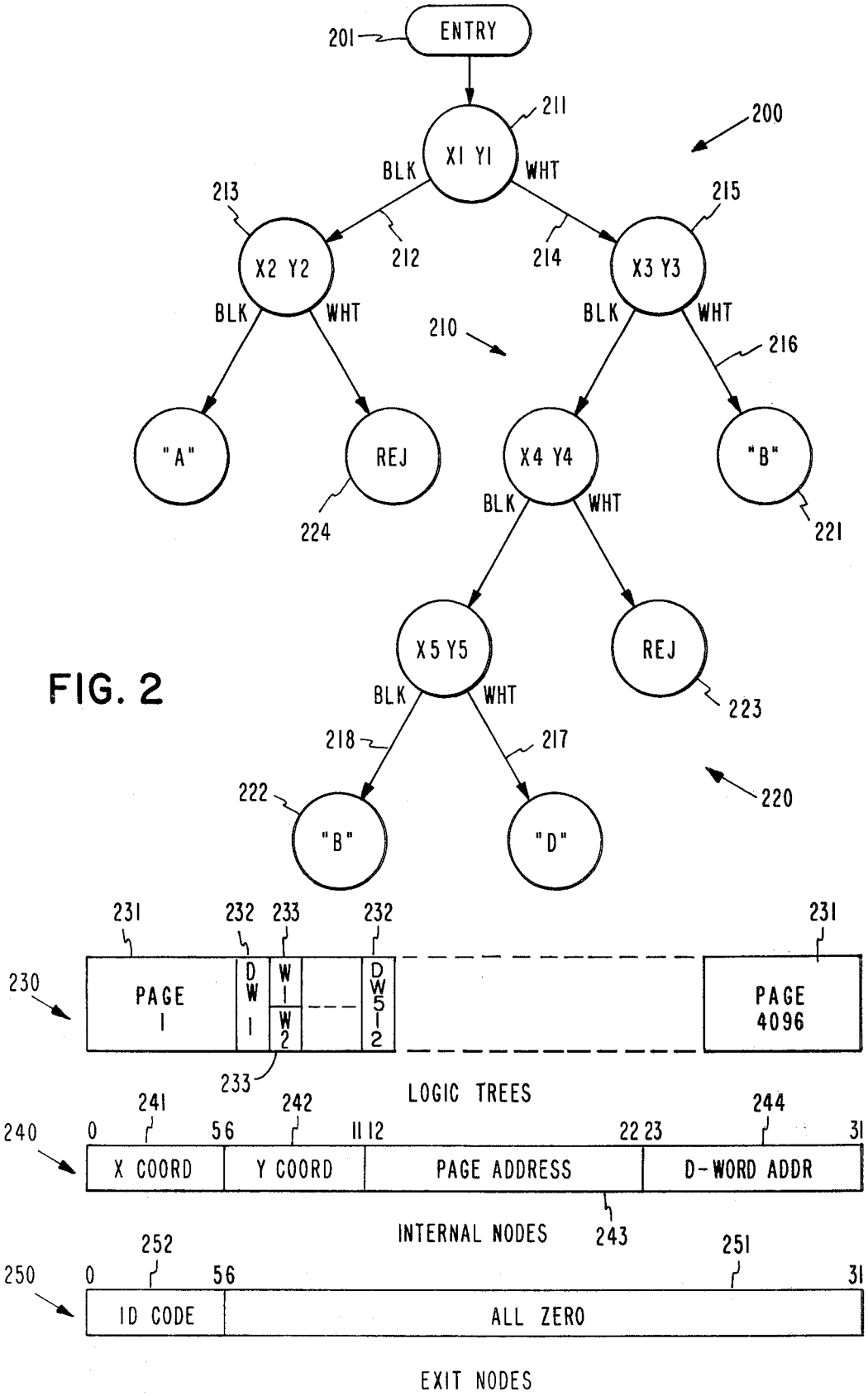
Figure 3:
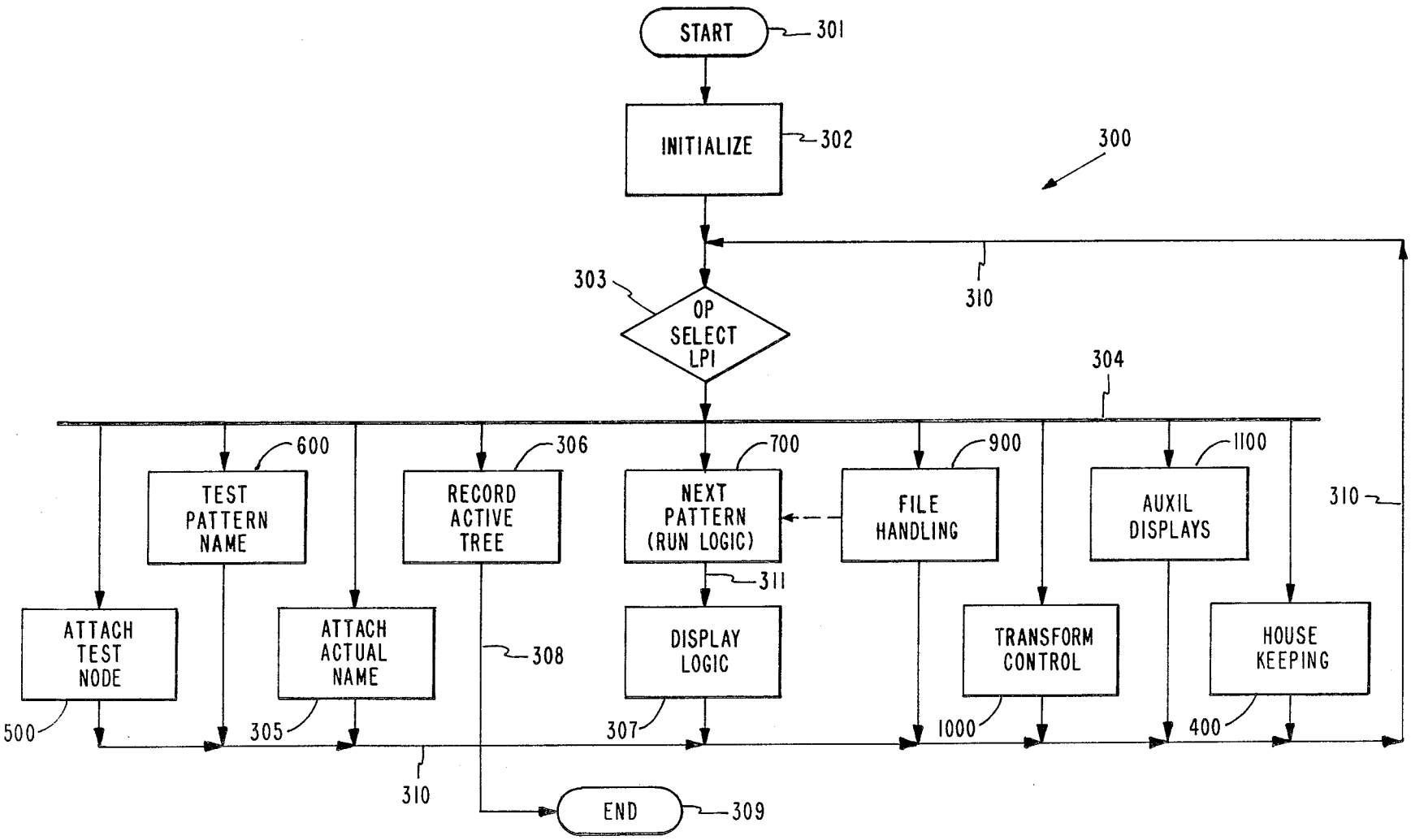
Figure 4:
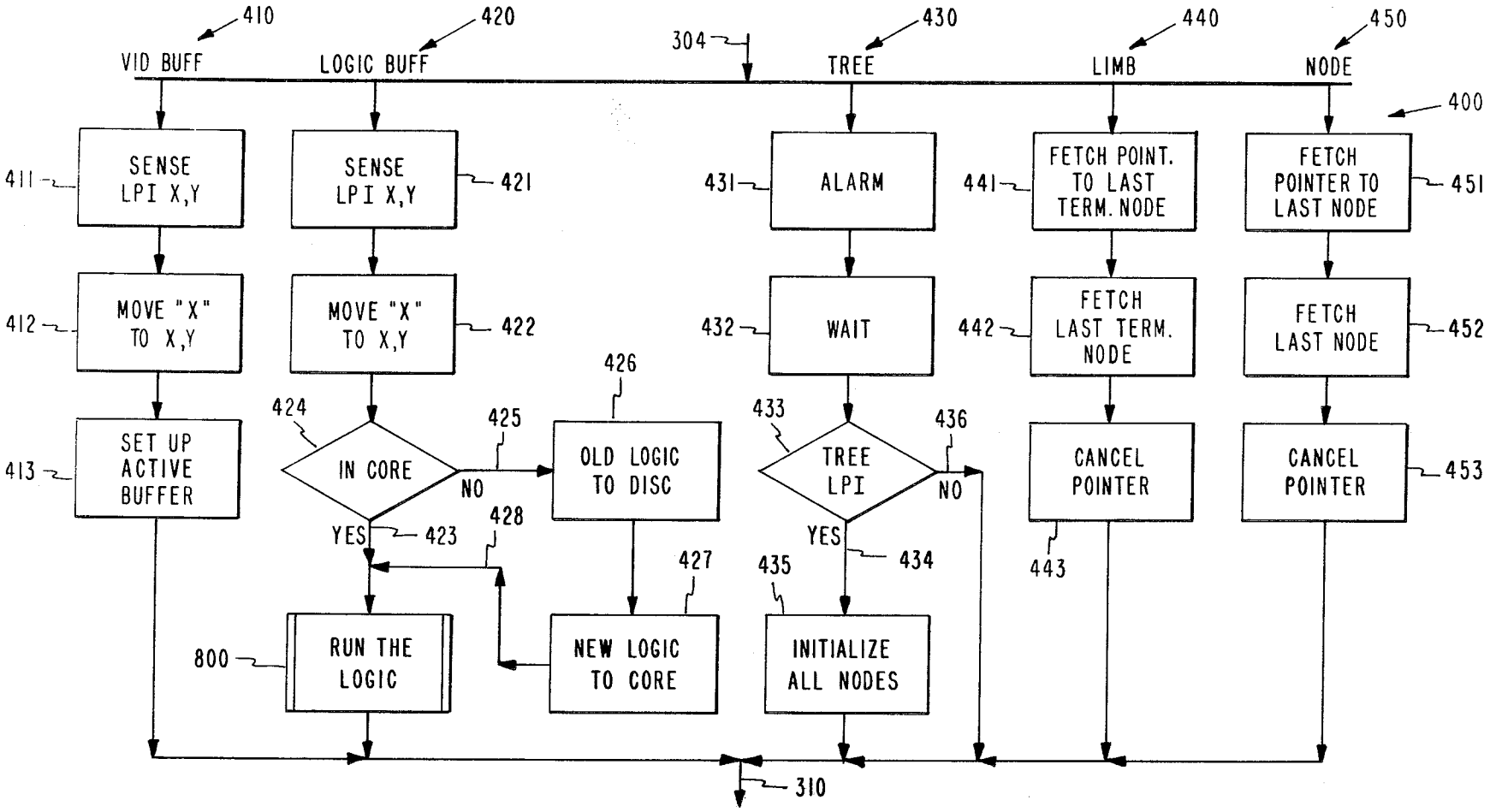
Figure 5:
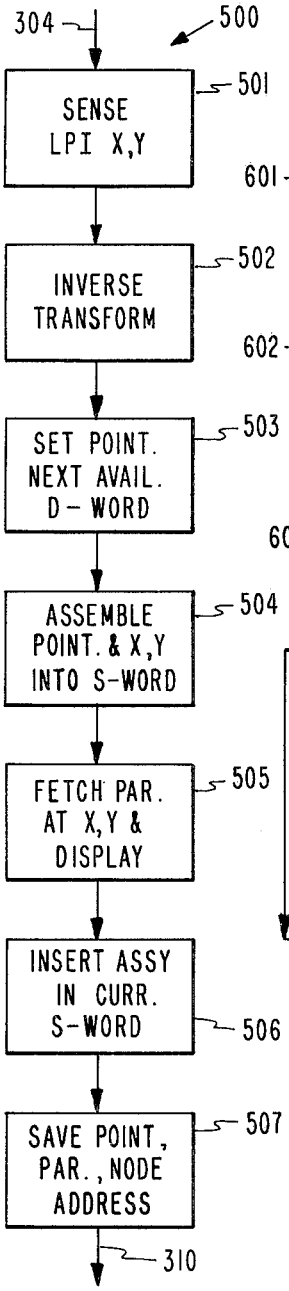
Figure 6:
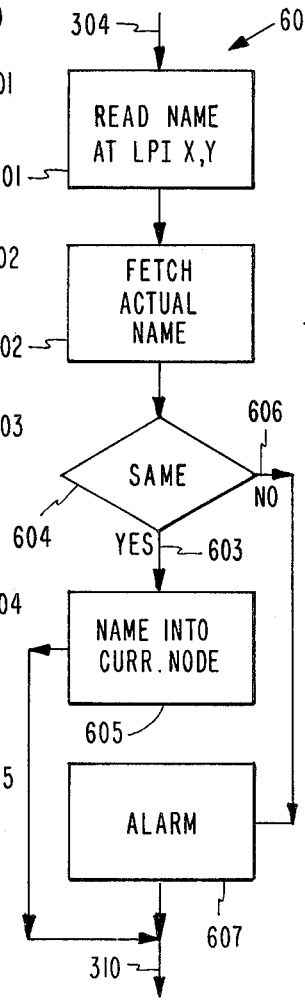
Figure 7:
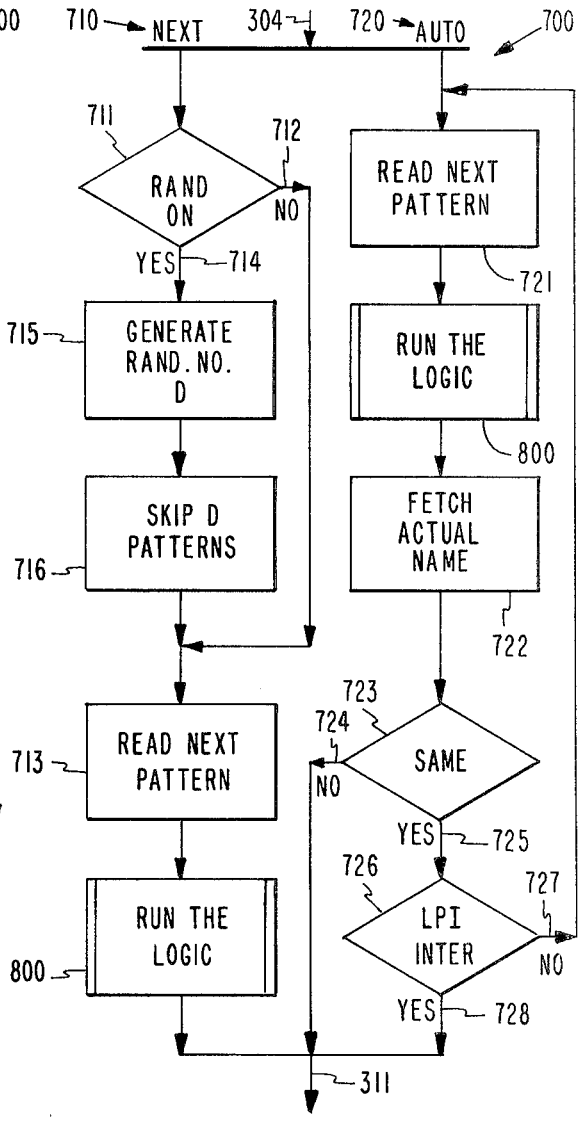
Figure 9:
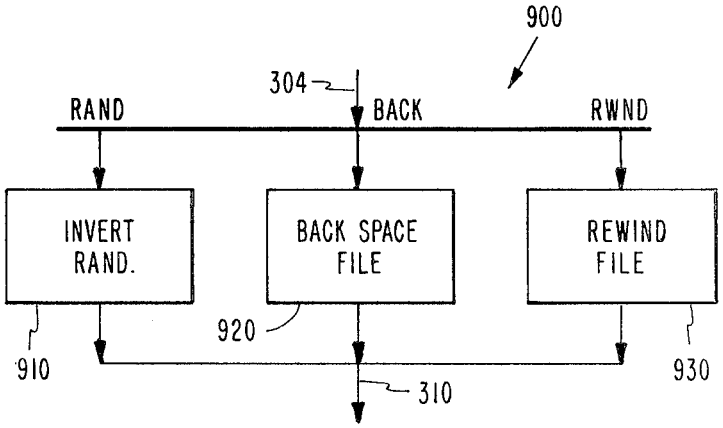
Figure 10:
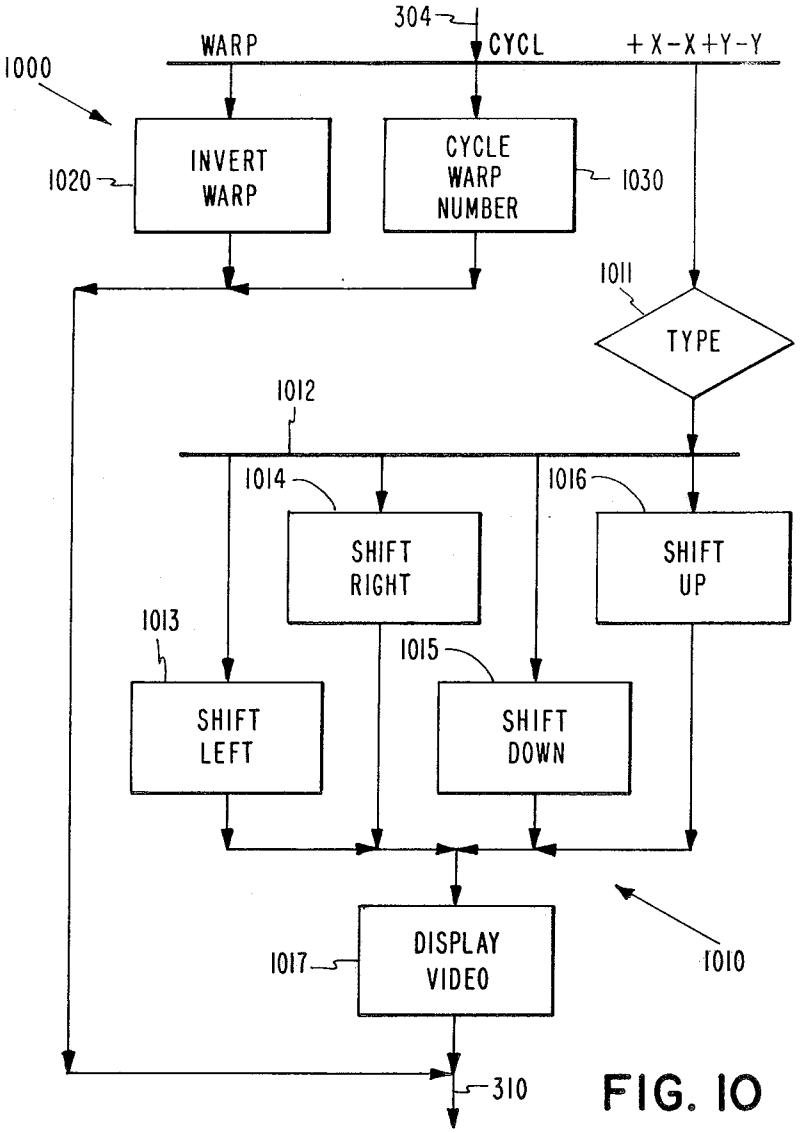
Figure 8:
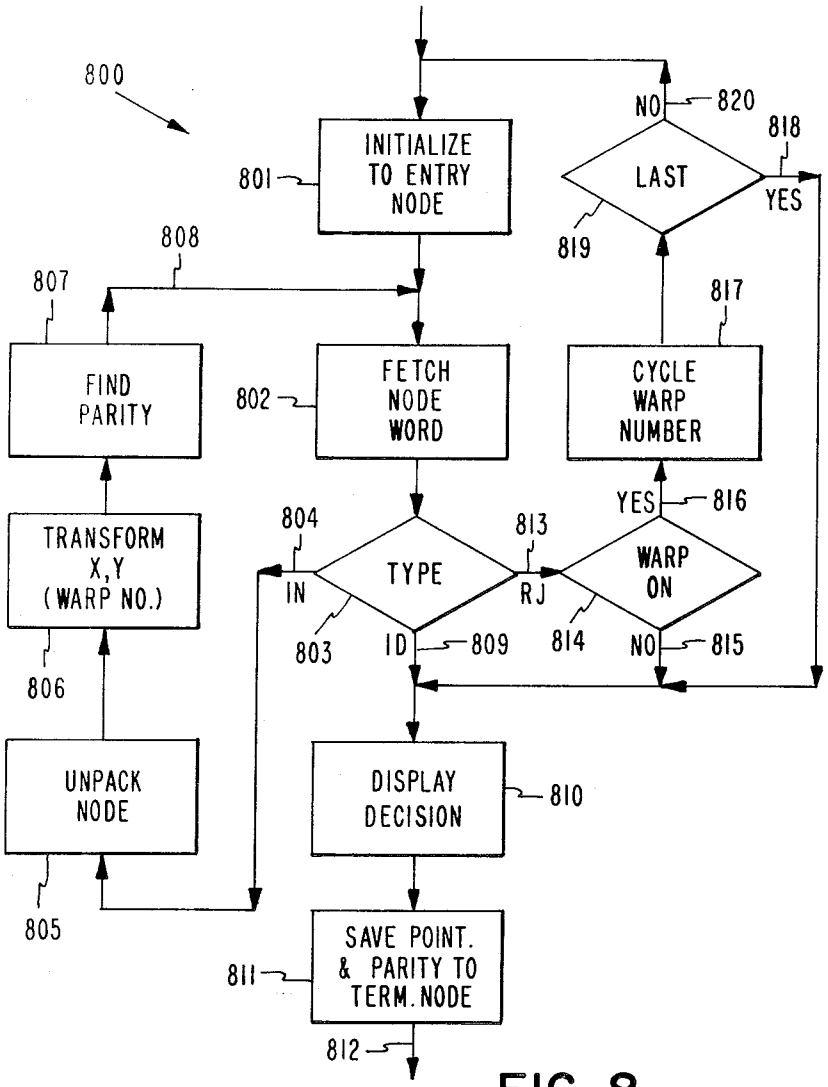
Figure 11:
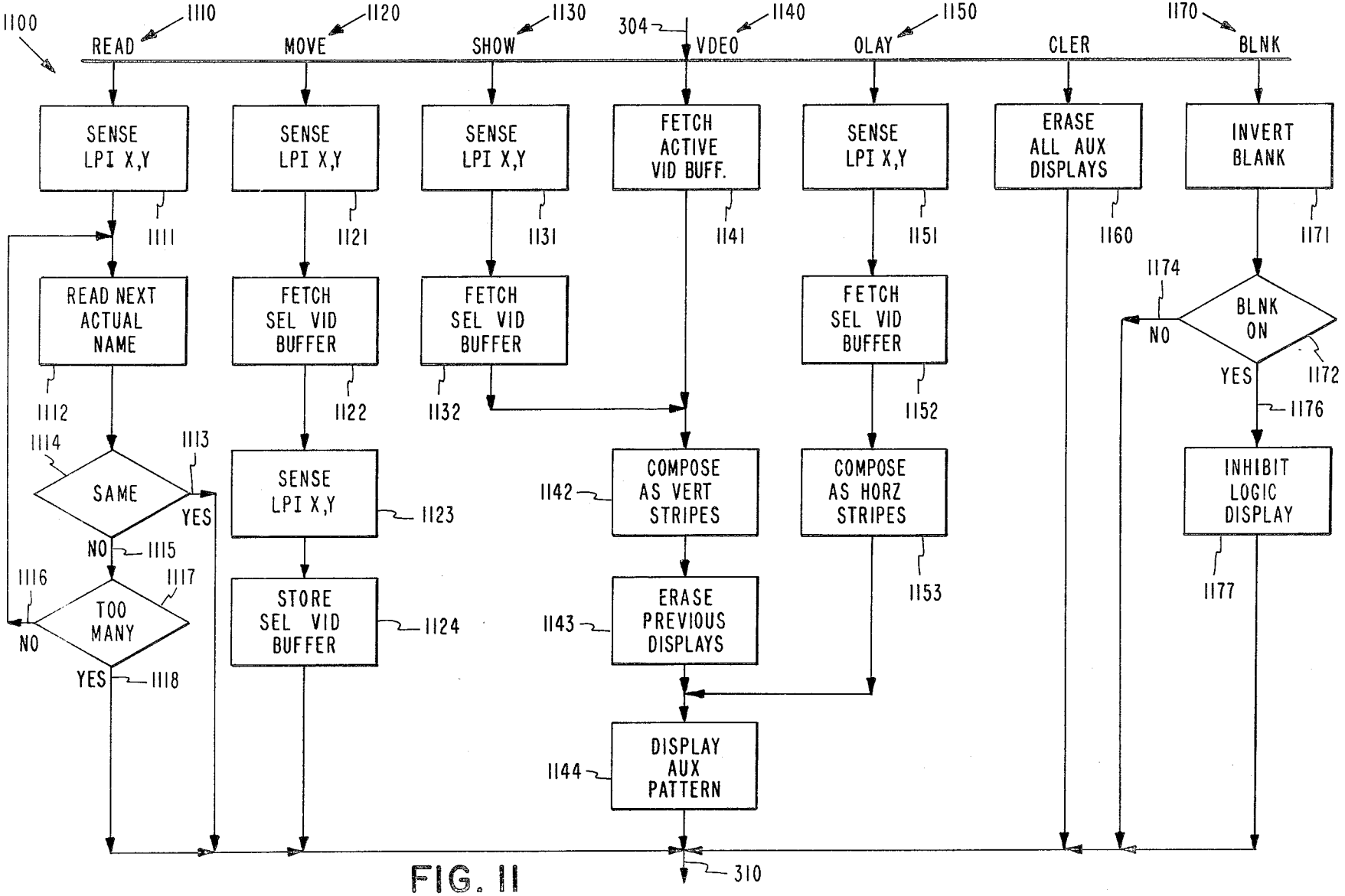

United States Defensive Publication [19] (H) [11] T980,008

Naylor [43] Mar. 6, 1979

[54] INTERACTIVE DESIGN OF CHARACTER-RECOGNITION LOGICS

[75] Inventor: William C. Naylor, Rochester, Minn.

[73] Assignee: International Business Machines Corporation, Armonk, N.Y.

[21] Appl. No.: 706,973

[22] Filed: Jul. 19, 1976

Related U.S. Application Data

[63] Continuation of Ser. No. 309,578, Nov. 24, 1972, which is a continuation of Ser. No. 78,712, Oct. 7, 1970.

[51] Int. Cl.[2] ..... G06K 9/12

[52] U.S. Cl. ..... 340/146.3 AQ; 340/146.3 Q

[57] ABSTRACT

A stored-program computer reads a sequence of input patterns and outputs a decision-tree logic for recognizing those patterns. A terminal is coupled to the computer for producing a graphic display of the pattern portions or locations, a list of pattern-class names and a menu of operations. The display also presents a running representation of the recognition logics. A light pen selects locations of an input pattern for addition to the logic, identifies the input pattern and selects various ones of the menu operations. Auxiliary operations in the menu are available for modifying the sequence of input patterns, applying linear transformations to the patterns, the display of selected patterns on the terminal, and various housekeeping functions.

46 Claims, 7 Sheets Drawing,

44 Pages Specification

The file of this unexamined application may be inspected and copies thereof may be purchased (849 O.G. 1221, Apr. 9, 1968).

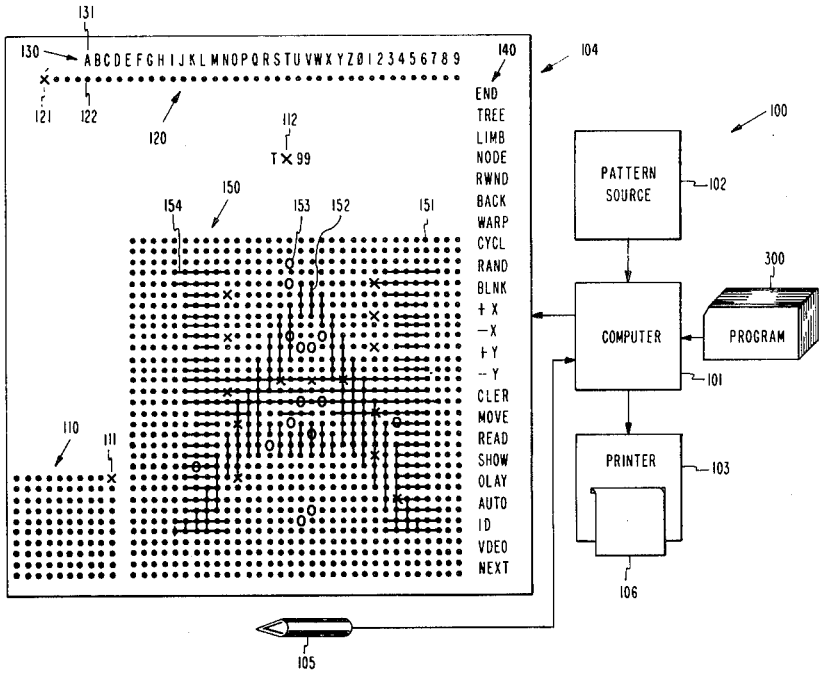

INVENTOR
WILLIAM C. NAYLOR
BY J. Michael Aylward
ATTORNEY